United States Patent
Park et al.

(10) Patent No.: US 9,807,203 B2
(45) Date of Patent: Oct. 31, 2017

(54) METHOD AND APPARATUS FOR CONTENT TRANSMISSION AND CONTENT RECEPTION

(71) Applicants: Samsung Electronics Co., Ltd., Suwon-si (KR); Ajou University Industry-Academic Cooperation Foundation, Suwon-si (KR)

(72) Inventors: Jong Han Park, Seoul (KR); Jae Hoon Kim, Yongin-si (KR); Young-Bae Ko, Suwon-si (KR); Myeong Wuk Jang, Hwaseong-si (KR); Sung-Won Lee, Suwon-si (KR); Gue-Hwan Jung, Suwon-si (KR)

(73) Assignees: Samsung Electronics Co., Ltd., Suwon-si (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 61 days.

(21) Appl. No.: 14/280,967

(22) Filed: May 19, 2014

(65) Prior Publication Data
US 2015/0124816 A1 May 7, 2015

(30) Foreign Application Priority Data
Nov. 7, 2013 (KR) .................. 10-2013-0134706

(51) Int. Cl.
*H04L 29/06* (2006.01)
*H04L 1/18* (2006.01)
*H04L 1/00* (2006.01)

(52) U.S. Cl.
CPC ............ *H04L 69/22* (2013.01); *H04L 1/1809* (2013.01); *H04L 2001/0093* (2013.01)

(58) Field of Classification Search
CPC ...................................................... H04L 69/22
See application file for complete search history.

(56) References Cited

U.S. PATENT DOCUMENTS

| | | | |
|---|---|---|---|
| 8,204,060 | B2 | 6/2012 | Jacobson et al. |
| 8,244,881 | B2 | 8/2012 | Thornton et al. |
| 8,386,622 | B2 | 2/2013 | Jacobson |

(Continued)

FOREIGN PATENT DOCUMENTS

| | | |
|---|---|---|
| KR | 10-2010-0088562 A | 8/2010 |
| KR | 10-2013-0008325 A | 1/2013 |
| KR | 10-2013-0064500 A | 6/2013 |

OTHER PUBLICATIONS

BongYong Kwon et al. "A Efficient Transmission Suport Scheme for Content Centric Networking" Kyung Hee University, 4 pages (2013) (In Korean with English Abstract).

*Primary Examiner* — Jason Mattis
(74) *Attorney, Agent, or Firm* — NSIP Law

(57) ABSTRACT

A method of transmitting content to a content receiver and of receiving content from a content transmitted is provided. The method may include receiving, at a content transmitter, a content transmission request fragmenting a segmented content corresponding to the content transmission request into at least one frame, generating a header comprising a frame identifier for the at least one frame, and transmitting the at least one frame and the header to the content receiver.

17 Claims, 17 Drawing Sheets

(56) References Cited

U.S. PATENT DOCUMENTS

| | | | |
|---|---|---|---|
| 2005/0216812 A1* | 9/2005 | Leon | H04L 1/1887 714/748 |
| 2008/0031177 A1* | 2/2008 | Lee | H04H 20/72 370/312 |
| 2011/0205972 A1* | 8/2011 | Yuk | H04W 76/021 370/328 |
| 2011/0271007 A1* | 11/2011 | Wang | H04L 45/306 709/238 |
| 2012/0155464 A1* | 6/2012 | Kim | H04L 12/1859 370/390 |
| 2012/0158973 A1 | 6/2012 | Jacobson et al. | |
| 2013/0185406 A1 | 7/2013 | Choi et al. | |
| 2014/0237085 A1* | 8/2014 | Park | G06Q 50/10 709/219 |
| 2015/0023355 A1* | 1/2015 | Tokumo | H04L 69/324 370/394 |
| 2015/0095481 A1* | 4/2015 | Ohnishi | H04L 1/004 709/223 |
| 2015/0120895 A1* | 4/2015 | Solis | H04L 45/74 709/223 |

* cited by examiner

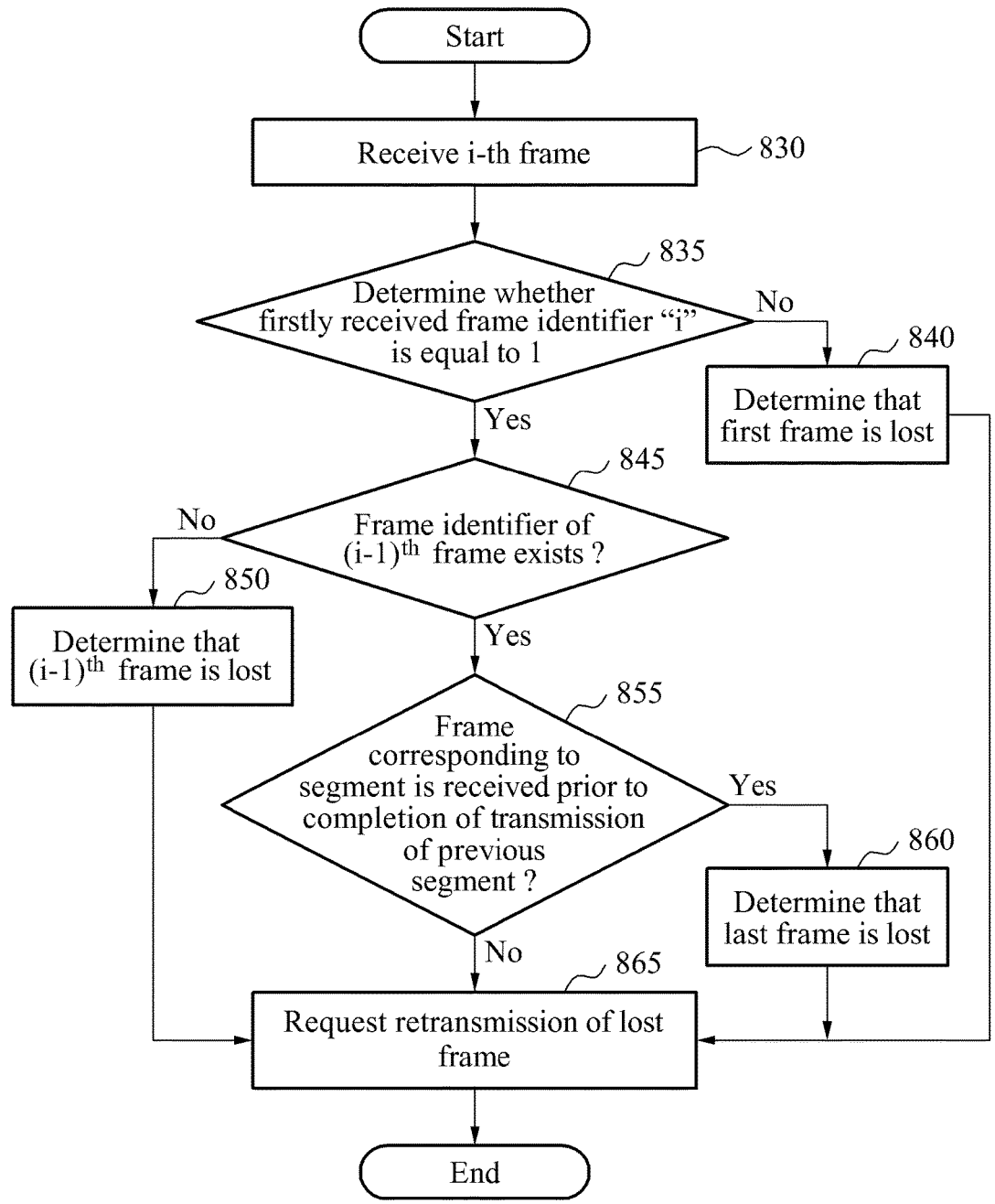

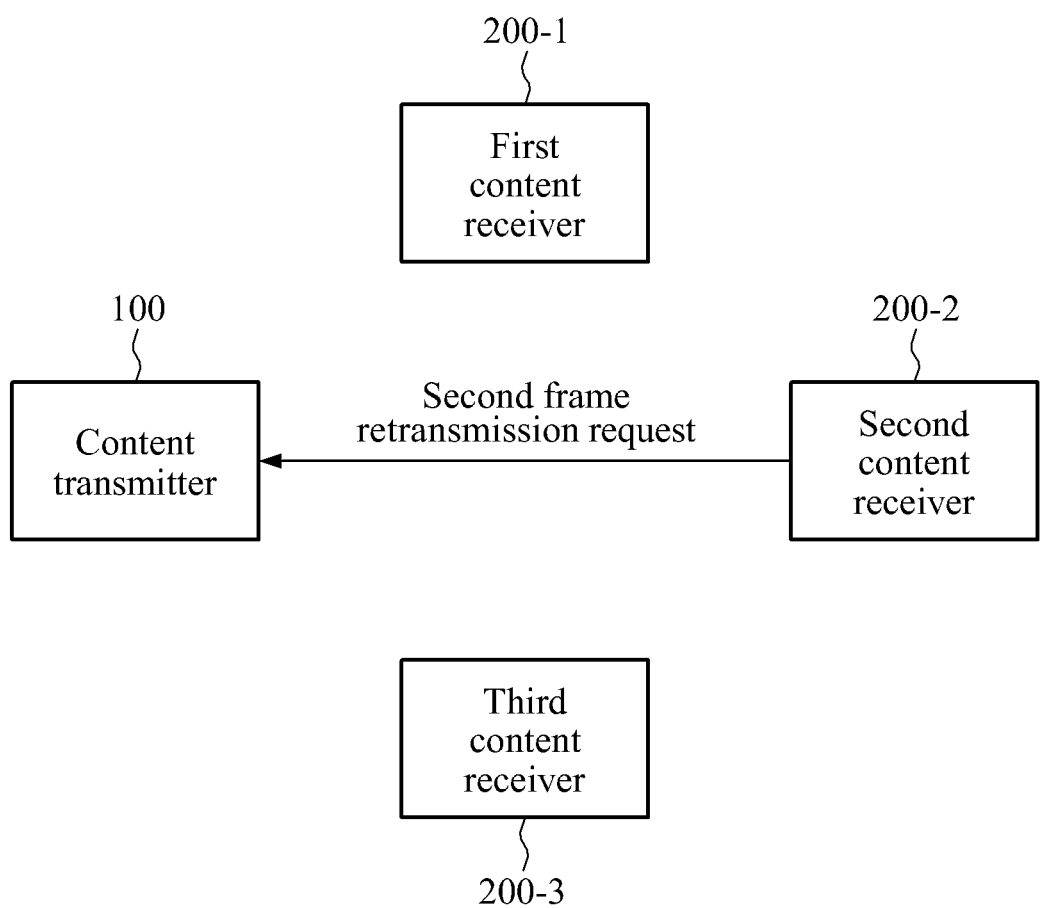

METHOD AND APPARATUS FOR CONTENT TRANSMISSION AND CONTENT RECEPTION

RELATED APPLICATIONS

This application claims the benefit under 35 U.S.C. §119(a) of Korean Patent Application No. 10-2013-0134706, filed on Nov. 7, 2013, in the Korean Intellectual Property Office, the entire disclosure of which is incorporated herein by reference for all purposes.

BACKGROUND

1. Field

The following description relates to a content transmitter, a content receiver, a content transmission method, and a content reception method, and to a content name-based content transmitter, a content name-based content receiver, a content name-based content transmission method, and a content name-based content reception method.

2. Description of Related Art

In a content name-based networking technology, for example, a content-centric networking (CCN), a name of required content, instead of a source address or a destination address, is described in a header of a packet, unlike an internet protocol (IP)-based networking. Each of routers may include a routing table to enable each of the routers to check a name of content described in a header of a packet and to transfer the packet to a node including the content. Since all networking devices include cache storages, content may be temporarily stored.

In content-name networking, packets are classified into content request packets and content transfer packets. A content request packet contains a name of content that is to be requested. A content transfer packet contains requested content, a name of the requested content, and the like. For example, when a content request packet is received, networking equipment may search for requested content from a storage area of the networking equipment, using a name of the requested content that is described in a header of the content request packet. In this example, when the requested content is found, the networking equipment may transfer, to a requester, the requested content in the form of a content transfer packet. Thus, in the content-name networking, a predetermined node located in a route to an original owner of the requested content may provide the requested content when the requested content is stored in a storage area of the predetermined node. On the other hand, in an IP-based networking, requested content is required to be received directly from the original owner of the requested content. Thus, an average length of a transmission route for obtaining requested content may be longer in the IP-based networking than in the content-name networking. Accordingly, switching from the IP-based networking to the content-name networking may result in a reduced overall network usage. Accordingly, in the content-name networking, content may be stored in networking equipment located in a route through which the content is transferred, and the stored content may be more quickly transferred to a content requester based on a name of the content.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of transmitting content, the method including receiving, at a content transmitter, a content transmission request, fragmenting a segmented content corresponding to the content transmission request into at least one frame, generating a header comprising a frame identifier for the at least one frame, and transmitting the at least one frame and the header to the content receiver.

The generating of the header may include generating the frame identifier based on a frame number of the at least one frame.

The generating of the header may include generating the frame identifier based on at least one of a name of the content or a segment number of a segment comprising the at least one frame.

The generating of the header may include generating the header with the frame identifier in a link adaptor layer set as an upper layer of a media access control (MAC) layer.

The generating of the header may include generating the header with the frame identifier in the link adaptor layer, based on at least one of a name of the content and a segment number that are set in an upper layer of the link adaptor layer.

The header may be disposed in the at least one frame.

The method may include receiving a lost frame retransmission request from a content receiver.

The lost frame retransmission request may include a frame identifier of a frame that the content receiver did not received.

The method may include retransmitting a frame corresponding to the lost frame retransmission request to the content receiver, or multicasting or broadcasting the frame.

The retransmitting of the frame The method may include retransmitting a frame corresponding to a frame identifier comprised in the lost frame retransmission request.

The retransmitting of the frame may include retransmitting the frame in a link adaptor layer set as an upper layer of a MAC layer.

In another general aspect, there is provided a method of receiving content from a content transmitter, the method including transmitting a content transmission request to the content transmitter, and receiving at least one frame containing at least a portion of a segmented content corresponding to the content transmission request, wherein the at least one frame comprises a header with a frame identifier of the at least one frame.

The method may include determining a lost frame that is not received from the content transmitter.

The method may include transmitting a lost frame retransmission request to the content transmitter.

The lost frame retransmission request may include a frame identifier of the lost frame.

The method may include collecting a frame corresponding to the lost frame retransmission request from the content transmitter.

The collecting of the frame may include receiving a frame corresponding to a frame identifier of the lost frame retransmission request.

The collecting of the frame may include collecting the frame in a link adaptor layer set as an upper layer of a media access control (MAC) layer.

The determining may include determining the lost frame based on a frame identifier of the received at least one frame.

In another general aspect, there is provided a content receiver for receiving content from a content transmitter, the content receiver including a communicator configured: to transmit a content transmission request to the content transmitter, based on a content name, and to receive at least one frame containing at least a portion of a segmented content corresponding to the content transmission request, the content name being defined in a first layer, and a controller configured: to determine a lost frame that is not received from the content transmitter, and to control the communicator to transmit a lost frame retransmission request based on at least one information defined in the first layer to request retransmission of the lost frame in a second layer, the second layer being a lower layer of the first layer.

Other features and aspects will be apparent from the following detailed description, the drawings, and the claims.

BRIEF DESCRIPTION OF THE DRAWINGS

FIGS. 8A and 8B are diagrams illustrating examples of determining whether a frame is lost.

FIGS. 11A and 11B are diagrams illustrating examples of an operation of a content transmission and reception system.

Figure 1:
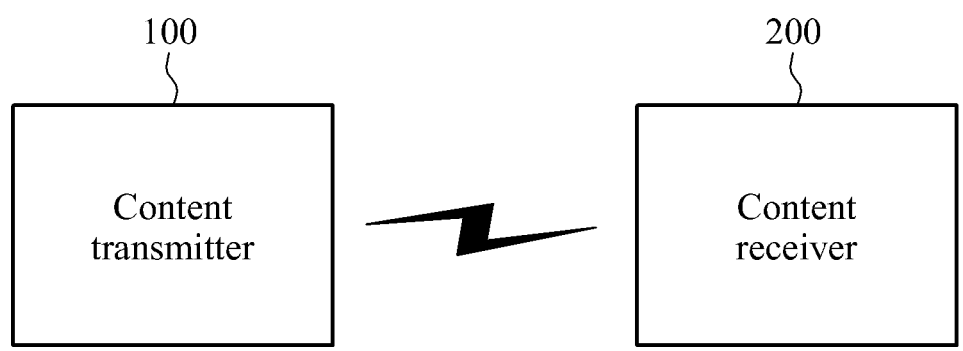
FIG. 1 is a diagram illustrating an example of a content name-based networking system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1 illustrates an example of a content name-based networking system. As illustrated in FIG. 1, the content name-based networking system includes a content transmitter 100, and a content receiver 200. The content receiver 200 may be configured to transmit a content transmission request to request the content transmitter 100 to transmit content. The content transmitter 100 may be configured to transmit content corresponding to the content transmission request to the content receiver 200. For example, the content receiver 200 may transmit a content transmission request packet to the content transmitter 100. The content transmission request packet may include, for example, an identifier or a name of content. The content transmission request packet may further include at least one of a selector and a random temporary variable (nonce).

In FIG. 1, the content receiver 200 transmits the content transmission request packet directly to the content transmitter 100, however, this is an non-exhaustive example, and other configurations are considered to be well within the scope of the present disclosure. For example, at least one router may be located between the content transmitter 100 and the content receiver 200. In this example, the router may relay the content transmission request packet from the content receiver 200 to the content transmitter 100. The router may perform routing, based on an identifier or a name of content, instead of an existing Internet protocol (IP) address. Additionally, the router may store and relay the content transmission request packet, if necessary.

The content transmitter 100 may receive the content transmission request packet. The content transmitter 100 may verify requested content from the received content transmission request packet. The content transmitter 100 may transmit content corresponding to the content transmission request packet to the content receiver 200. In an example, the content transmitter 100 may directly transmit the content corresponding to the content transmission request packet to the content receiver 200. In another example, the content transmitter 100 may transmit the content corresponding to the content transmission request packet to at least one router located between the content transmitter 100 and the content receiver 200. In this example, the router may relay the received content. In addition to content information, the content may include, for example, at least one of a content name, identifier information, signature information of signed information. As described above, the content transmitter 100 and the content receiver 200 may transmit and receive a content name-based packet. A content name-based networking may be implemented by various types of networking, such as, for example, a content-centric networking (CCN), a data-oriented network architecture (DONA), a publish-subscribe Internet routing paradigm (PSIRP), or a networking of information (NetInf).

As illustrated in FIG. 1, the content transmitter 100 and the content receiver 200 communicate wirelessly. However wireless communication is merely an example of a communication protocol, and those skilled in the art may understand that various types of type of wired and wireless communication may be used in a content transmission and reception system without departing from the spirit and scope of the illustrative examples described.

The content transmitter 100 may act as a content generator or a content owner. For example, when a content owner, instead of a content generator, receives a content transmission request from the content receiver 200, content corresponding to the content transmission request may be provided, which will be described below.

The content receiver 200 may include a table associated with possession of content. For example, when a content transmission request is relayed by a router, the router may include a table associated with possession of content. In response to the content transmission request, the router may relay the content transmission request, based on the table.

As described above, the content transmitter 100 and the content receiver 200 may transmit and receive a content name-based packet, instead of an internet protocol (IP)-based packet. Accordingly, in the content name-based networking system, it is possible to prevent the same data from being repeatedly transmitted, and to quickly provide services. On the other hand, in a conventional IP-based networking, transmission and security are repeatedly performed based on one-to-one communication between a transmitter and a receiver.

Figure 2:
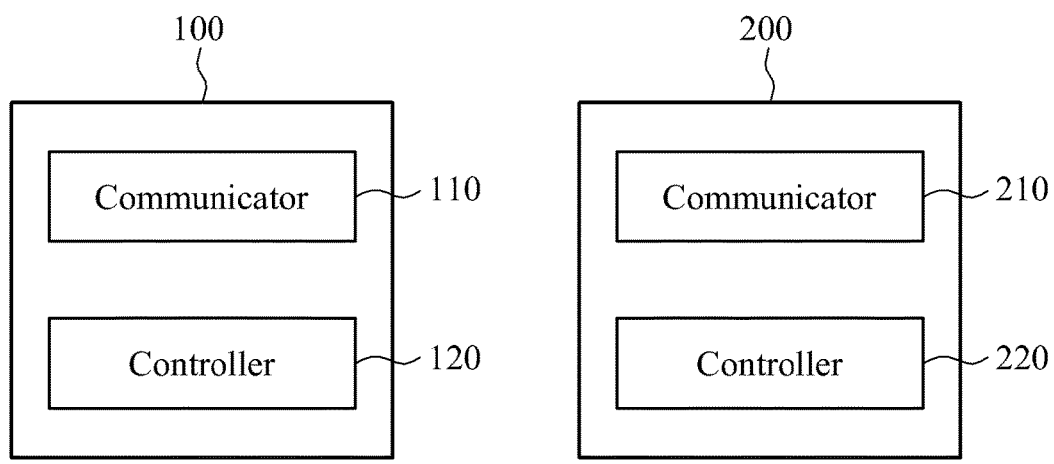
FIG. 2 is a diagram illustrating an example of a configuration of a content transmitter and a content receiver.

FIG. 2 illustrates a configuration of the content transmitter 100, and a configuration of the content receiver 200. As illustrated in FIG. 2, the content transmitter 100 includes a communicator 110, and a controller 120. The content receiver 200 includes a communicator 210, and a controller 220.

The communicators 110 and 210 may communicate with each other using a predetermined scheme. The communicator 110 or 210 may include at least one of a wired local area network (LAN) module, a wireless LAN (WLAN) module, or a near field communication (NFC) module. The communicators 110 and 210 may transmit a packet and may receive a packet.

The controller 120 or 220 may include, for example, a central processing unit (CPU), a read only memory (ROM), and a random access memory (RAM). The ROM may store a control program to control an apparatus. The RAM may be used to store a signal or data received from outside a node 200, or may be used as a memory area for a task performed in the node 200. The CPU may include, for example, a single core, a dual core, a triple core, or a quad core. The CPU, the ROM, and the RAM may be interconnected via an internal bus.

The controller 120 or 220 may be configured to generate a content transmission request packet, to fragment content into frames, to generate a header of each of the frames, to determine whether a frame is lost, and the like.

Figure 3:
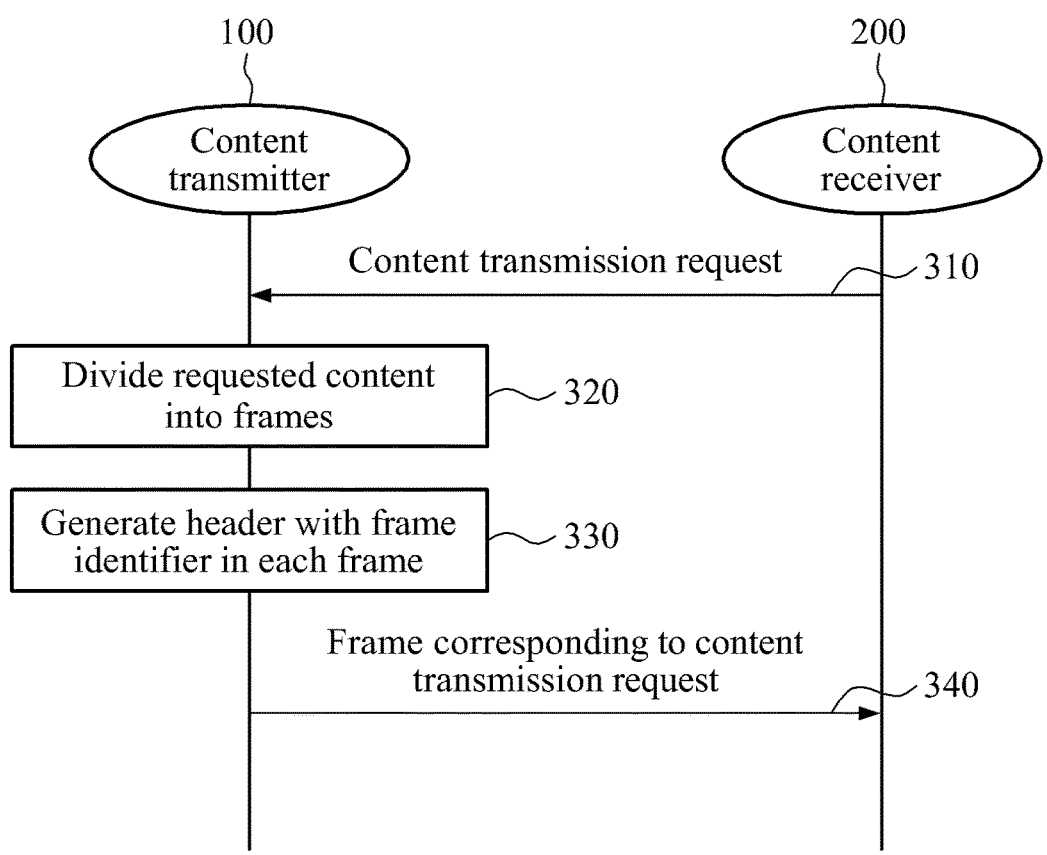
FIG. 3 is a diagram illustrating an example of an operation of a content transmission and reception system.

FIG. 3 illustrates an example of an operation of a content transmission and reception system. The operations in FIG. 3 may be performed in the sequence and manner as shown, although the order of some operations may be changed or some of the operations omitted without departing from the spirit and scope of the illustrative examples described. Many of the operations shown in FIG. 3 may be performed in parallel or concurrently. The above descriptions of FIGS. 1-2, is also applicable to FIG. 3, and is incorporated herein by reference. Thus, the above description may not be repeated here.

Referring to FIG. 3, in 310, the content receiver 200 transmits a content transmission request to the content transmitter 100. As described above, the content receiver 200 may transmit the content transmission request to the content transmitter 100 directly, or it may be relayed through a router. The content transmission request may include, for example, an identifier or a name of content, and may further include at least one of a selector and a random temporary variable. The content transmitter 100 may receive the content transmission request. In 320, the content transmitter 100 may divide requested content into at least one frame. The dividing of the content will be further described with reference to FIG. 4.

Figure 4:
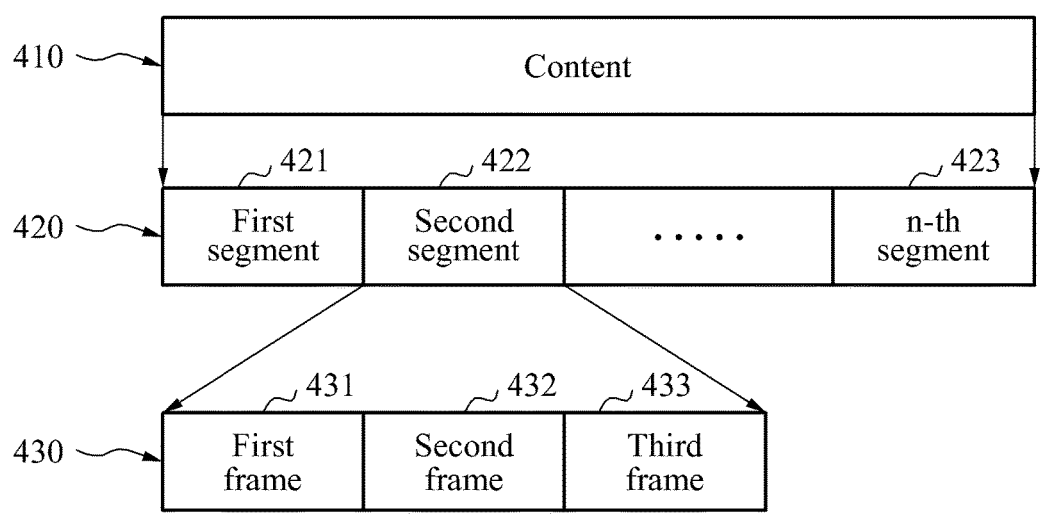
FIG. 4 is a diagram illustrating an example of division of content.

FIG. 4 illustrates an example of division of content. As illustrated in FIG. 4, content 410 may be divided into at least one segment, for example, a first segment 421, a second segment 422, and an n-th segment 423, and may be stored in the content transmitter 100. Each of the at least one segment may be separated into at least one frame, for example, a first frame 431, a second frame 432, and a third frame 433, at a time at which a content transmission request is received. The at least one frame may be used as a unit transmitted in a media access control (MAC) layer, for example, a packet unit.

Referring back to FIG. 3, in 330, the controller 120 of the content transmitter 100 generates a header including a frame identifier in each of the at least one frame. The controller 120 may generate a header including a frame identifier, based on at least one of a name and an identifier of content including a frame, a segment number, and a frame number. For example, the controller 120 may generate a frame identifier in a form of "content name-segment number-frame number," and may generate a header including the generated frame identifier for each frame. In the example of FIG. 4, the second frame 432 is included in the second segment 422 of the content 410. In this example, the controller 120 may generate "C1-S2-F2" as a frame identifier of the second frame 432, where C1 may indicate a name or an identifier of the content 410, S2 may indicate that a segment number is "2," and F2 may indicate that a frame number is "2." The above scheme of generating a frame identifier is merely a non-exhaustive example, and other schemes of generating a frame identifier are considered to be well within the scope of the present disclosure.

In 340, the communicator 110 of the content transmitter 100 transmits a frame corresponding to the content transmission request to the content receiver 200. As described above, the communicator 110 may transmit the frame corresponding to the content transmission request to the content receiver 200 directly, or it may relay the frame through the router. The frame corresponding to the content transmission request may include a header with a frame identifier. The content receiver 200 may receive the frame corresponding to the content transmission request, and may combine the received frame with the other frames into content. Additionally, as described below, the content receiver 200 may determine whether a frame is lost, based on a frame identifier of a header of the frame.

Figure 5:
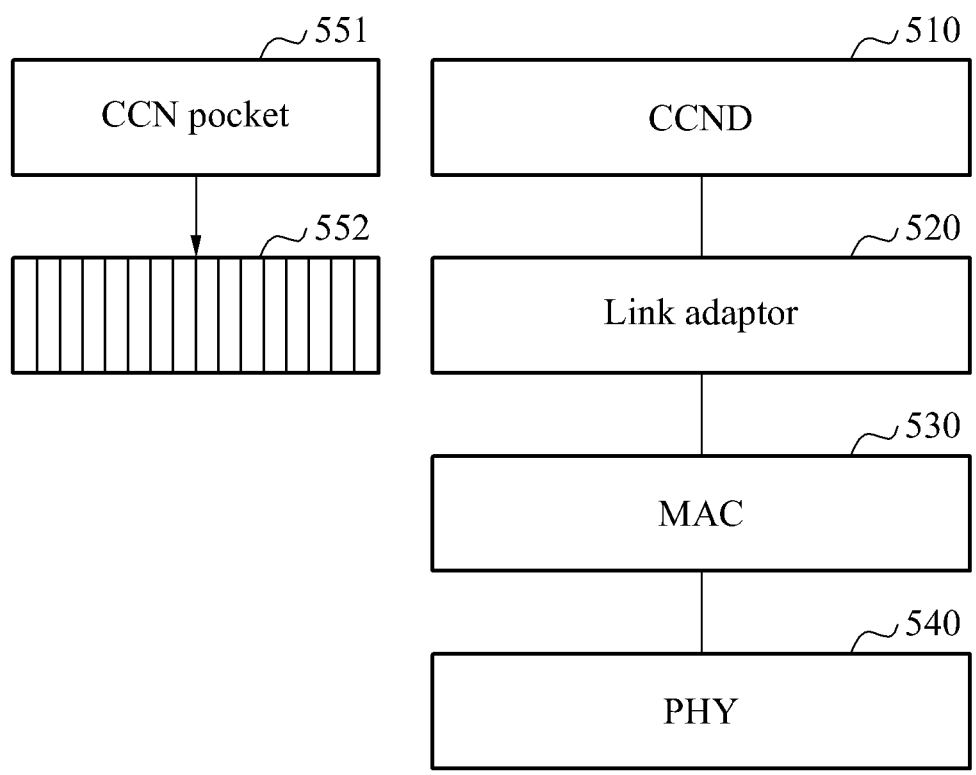
FIG. 5 is a diagram illustrating an example of a communication layer.

FIG. 5 illustrates an example of a communication layer. The communication layer of FIG. 5 includes a content-centric networking device (CCND) layer 510, a link adaptor layer 520, a MAC layer 530, and a physical (PHY) layer 540. A CCN application layer and a CCN library layer, although not illustrated, may exist as upper layers of the CCND layer 510. Content from the CCN application layer may be encoded and segmented in the CCN library layer. The segmented content may be stored in the CCND layer 510.

As illustrated in FIG. 5, segments of content may be stored in the CCND layer 510. For example, the CCND layer 510 may additionally include a CCN repository (CCNR), and content 551 may be segmented and stored in the CCNR.

The link adaptor layer 520 may fragment the segmented content 551 into frames, and may transfer the fragmented content 552 to the MAC layer 530. The MAC layer 530, and the PHY layer 540 may transfer a raw socket packet.

Figure 6:
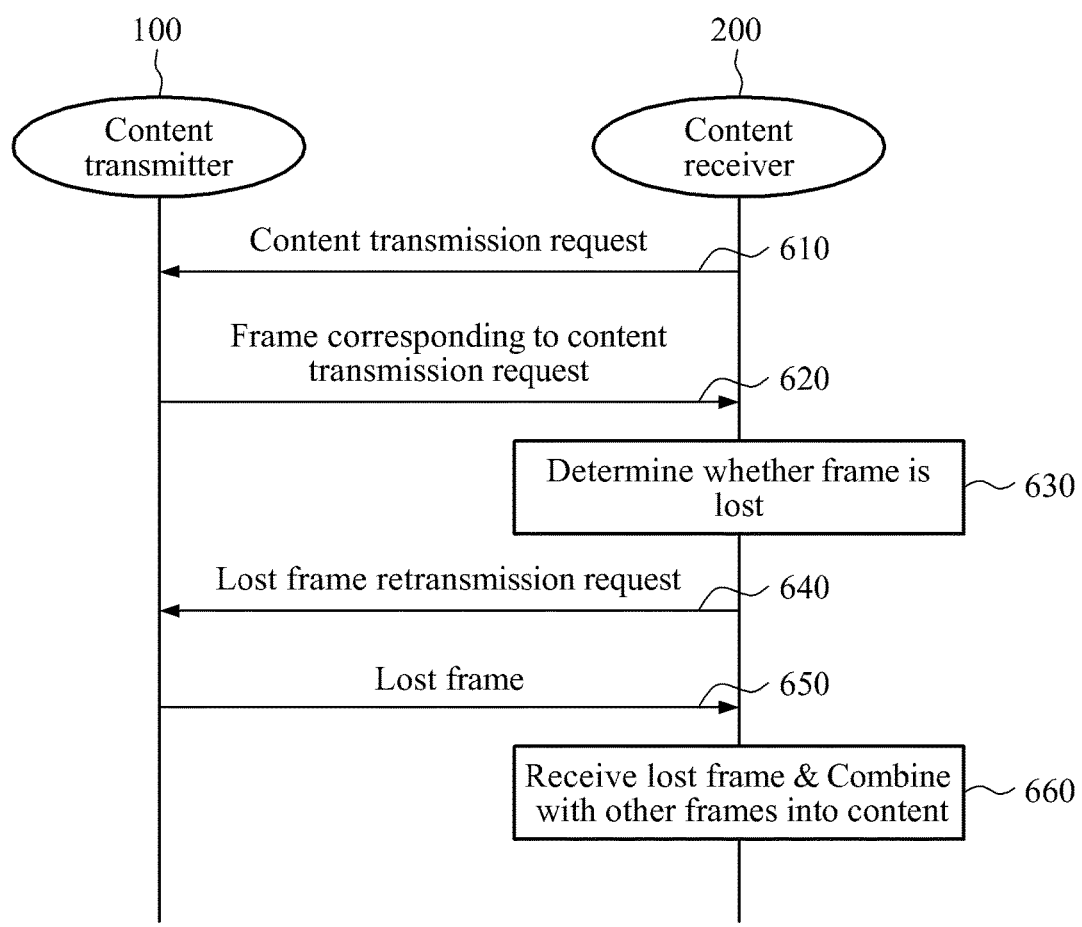
FIG. 6 is a timing diagram illustrating an example of an operation of the content transmitter and the content receiver.

FIG. 6 illustrates an example of an operation of each of the content transmitter 100 and the content receiver 200. Referring to FIG. 6, in 610, the content receiver 200 transmits a content transmission request to the content transmitter 100. In 620, the content transmitter 100 transmits a frame corresponding to the content transmission request to the content receiver 200.

In 630, the content receiver 200 determines whether the frame is lost during transmission. The content receiver 200 may check a header of the frame received from the content transmitter 100. The content receiver 200 may verify identification information of the frame from the header, and may determine whether the frame is lost, based on the verified identification information. For example, the controller 220 of the content receiver 200 may determine whether the frame is lost, based on at least one of a content name, a segmentation number, and a frame number that are included in the identification information. The content receiver 200 may determine whether the frame is lost, based on various schemes, which will be described with reference to FIGS. 8A and 8B.

In an example where the frame is determined to be lost, the content receiver 200 may transmit a lost frame retransmission request to the content transmitter 100 in 640. The lost frame retransmission request may include, for example, identification information of the lost frame. For example, when the second frame 432 of FIG. 4 is assumed to be lost during transmission, the controller 220 may determine that the second frame 432 is lost, and may generate a lost frame retransmission request that asks for retransmission of the lost frame 432. In this example, the lost frame retransmission request may include identification information of the second frame 432, for example, a frame identifier of the second frame 432. Accordingly, the controller 220 may generate a lost frame retransmission request including "C1-S2-F2" as the frame identifier of the second frame 432.

In the example of FIG. 6, a lost frame retransmission request including a single frame identifier is transmitted, when a single frame is lost, however, this is merely an example. For example, the content receiver 200 may monitor lost frames for a period of time. In this example, the content receiver 200 may collect identifiers of frames lost for a period of time, and may generate a lost frame retransmission request including the collected identifiers.

The controller 220 may control the communicator 210 to transmit the generated lost frame retransmission request. In 640, the communicator 210 transmits the lost frame retransmission request.

The content transmitter 100 may receive the lost frame retransmission request. The controller 120 of the content transmitter 100 may verify a lost frame identifier included in the received lost frame retransmission request. In 650, the controller 120 controls the communicator 110 to retransmit a lost frame corresponding to the lost frame identifier.

The lost frame may be retransmitted in a layer lower than the link adaptor layer 520 of FIG. 5. A layer that is upper than the CCND layer 510 may be designed, regardless of retransmission of the lost frame. In the link adaptor layer 520, the lost frame may be retransmitted, based on the frame identifier, as described above. The frame identifier may include, for example, a content name, and a segment number, and the link adaptor layer 520 may retransmit the lost frame, based on the content name, and the segment number included in the frame identifier. Accordingly, the lost frame may be retransmitted in corporation with the CCND layer 510 and the link adaptor layer 520. In other words, to retransmit the lost frame, a cross-layer scheme may be used.

In 660, the content receiver 200 receives the lost frame, and combines the received frame with the other frames into the content.

Figure 7:
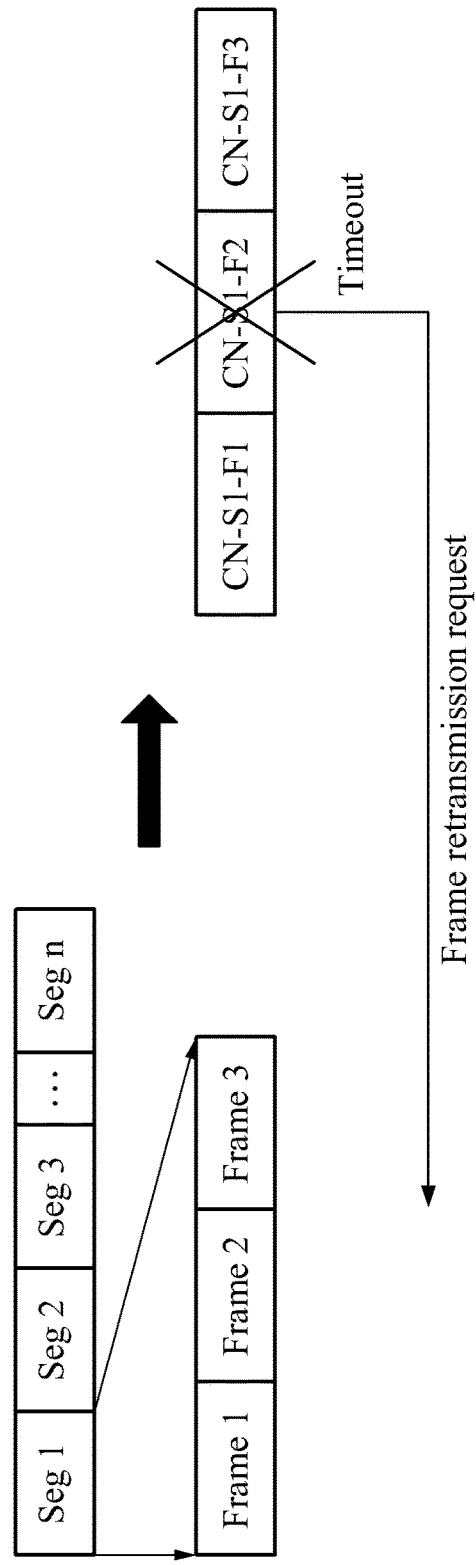
FIG. 7 is a diagram illustrating an example of retransmission of a lost frame.

FIG. 7 illustrates an example of retransmission of a lost frame. In FIG. 7, the content transmitter 100 may transmit content including a first segment to an n-th segment. For example, the first segment may include a first frame, a second frame, and a third frame. In this example, the second frame of the first segment may be lost during transmission. The content receiver 200 may transmit a lost frame retransmission request including a frame identifier of the second frame, for example, "CN-S1-F2" to the content transmitter 100. The content transmitter 100 may verify the frame identifier of the second frame from the lost frame retransmission request, and may retransmit only the second frame.

Figure 8A:
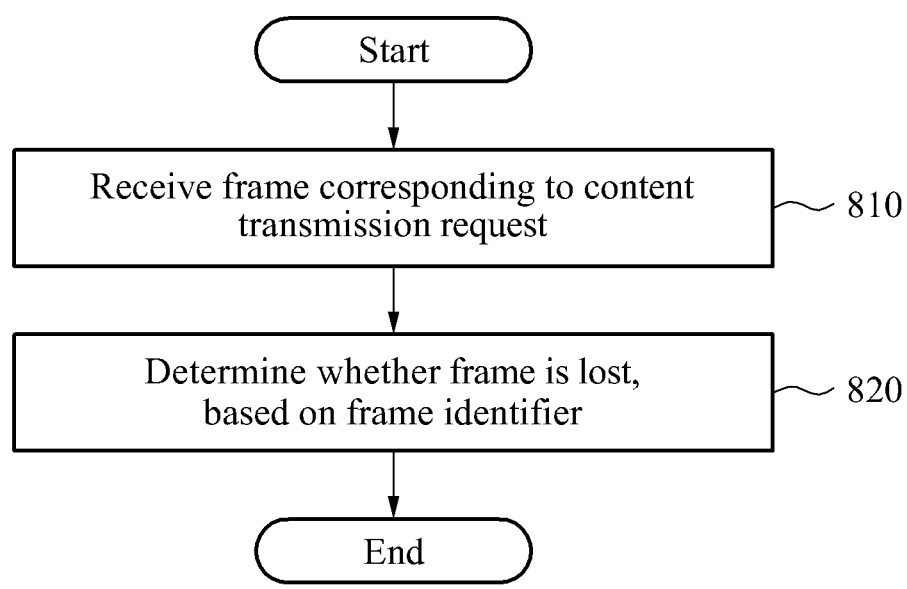

FIGS. 8A and 8B illustrate examples of determining whether a frame is lost. Referring to FIG. 8A, in 810, the content receiver 200 receives a frame corresponding to a content transmission request. In 820, the content receiver 200 determines whether the frame is lost, based on a frame identifier verified from a header of the frame.

Referring to FIG. 8B, in 830, the content receiver 200 receives an i-th frame. The content receiver 200 may verify a frame identifier from a header of the received i-th frame, and verify a frame number indicated by "i".

In 835, the content receiver 200 determines whether "i" in an identifier of a first received frame is "1." For example, the content receiver 200 may verify a frame number from the identifier of the first received frame, and may determine whether the frame number is "1."

In 840, when "i" is determined to be a number other than "1," the content receiver 200 may determine that a first frame is lost, or may determine that at least one frame having a number lower than "i," is lost.

In another example, when "i" is determined to be "1," the content receiver 200 may determine whether an (i−1)th frame is already received, for example, whether a frame identifier of the (i−1)th frame exists in 845. For example, the content receiver 200 may receive a frame with a frame number "5," and may determine whether a frame with a frame number "4" is already received.

In an example in which the (i−1)th frame is not received, in 850, the content receiver 200 may determine that the (i−1)-th frame is lost. In the above example, when the frame with the frame number "4" is not received, the content receiver 200 may determine that the frame with the frame number "4" is lost. In another example, the content receiver 200 may determine at least one frame between a last received frame and a previously received frame to be lost.

In 855, the content receiver 200 determines whether a frame corresponding to a segment is received prior to completion of transmission of a previous segment.

In an example in which the frame is determined to be received in 855, the content receiver 200 may determine that a last frame of the segment is lost in 860.

In 865, the content receiver 200 requests retransmission of a lost frame.

Figure 9A:
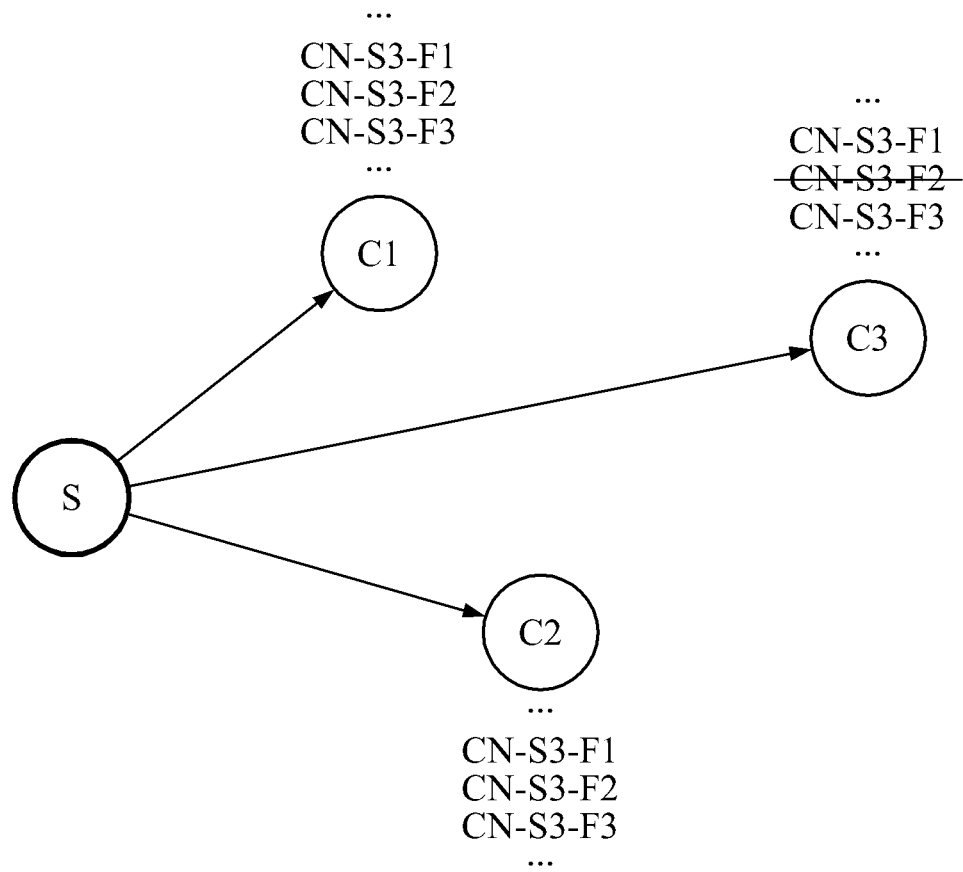
FIGS. 9A through 9C are diagrams illustrating examples of an operation of a content transmission and reception system.
Figure 9B:
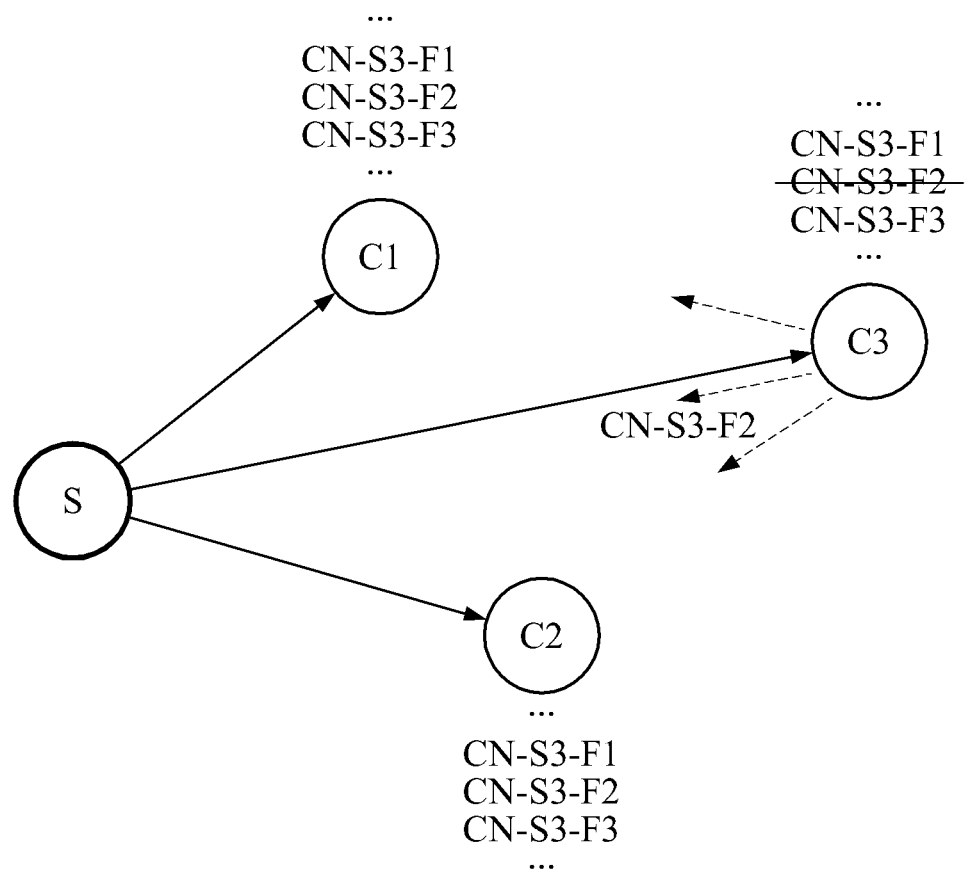
Figure 9C:
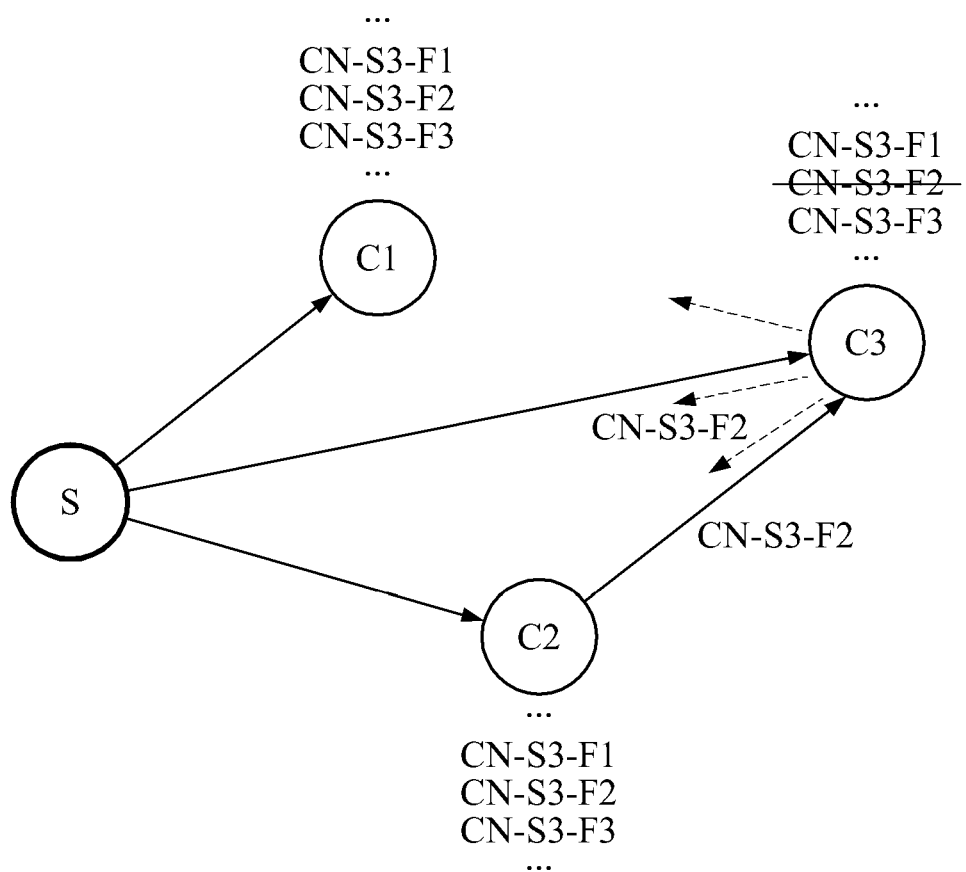

FIGS. 9A through 9C illustrate further examples of an operation of a content transmission and reception system.

Referring to FIG. 9A, a content transmitter S may multicast or broadcast content to a first content receiver C1, a second content receiver C2, and a third content receiver C3. In an example, the content transmitter S may multicast or broadcast a first frame, a second frame, and a third frame that have identifiers, for example, "CN-S3-F1," "CN-S3-F2," and "CN-S3-F3," respectively.

In this example, it is assumed that the third content receiver C3 fails to receive the second frame with "CN-S3-F2." Referring to FIG. 9B, the third content receiver C3 may determine that the second frame with "CN-S3-F2" is lost. The third content receiver C3 may multicast or broadcast a lost frame retransmission request including the identifier of the second frame, that is, "CN-S3-F2." For example, the third content receiver C3 may transmit the lost frame retransmission request to the first content receiver C1, and the second content receiver C2, as well as, the content transmitter S.

Referring to FIG. 9C, the content transmitter S may transmit the second frame with "CN-S3-F2" to the second content receiver C2. The second content receiver C2 may also transmit the received second frame with "CN-S3-F2" to the third content receiver C3. As described above, the content transmitter S may be, for example, a lost frame owner, as well as, a source.

Figure 10A:
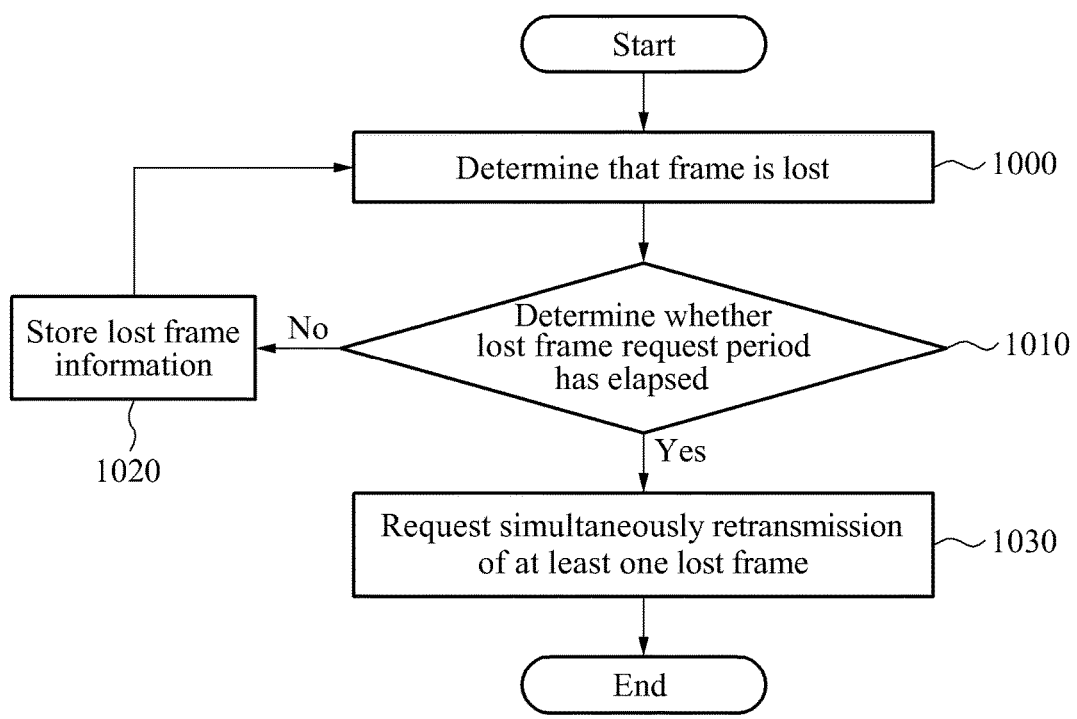
FIG. 10A is a diagram illustrating an example of an operation of a content receiver.

FIG. 10A illustrates an example of an operation of a content receiver. Referring to FIG. 10A, in 1000, the content receiver determines that a frame is lost. The content receiver may determine whether a received frame is lost, based on a frame identifier of the received frame, as described above with reference to FIG. 8A or 8B. For example, the content receiver may determine that a frame with a number "3" is lost. In a link adaptor layer, the content receiver may determine whether a frame is lost, as described above.

In 1010, the content receiver determines whether a lost frame request period has elapsed. For example, the content receiver may set the lost frame request period, based on a networking speed. In an example in which a higher networking speed is set, the content receiver may set a shorter lost frame request period.

In a non-exhaustive example, the content receiver may set a lost frame request duration during which a lost frame is to be requested. The content receiver may request transmission of a lost frame at random times for the lost frame request duration. This may prevent another content receiver from requesting transmission of the lost frame at the same time.

In an example where the lost frame request period does not elapse, the content receiver may store lost frame information, for example, a frame identifier of the lost frame, and may continue to monitor the lost frames in 1020. For example, the content receiver may determine that frames with numbers "3," "5," and "9" are lost during the lost frame request period.

In 1030, when the lost frame request period elapses, the content receiver may request simultaneously retransmission of at least one lost frame. For example, the content receiver may request retransmission of lost frames with numbers "3," "5," and "9."

In response to a request to simultaneously retransmit at least one lost frame that is received from the content receiver, a content transmitter may simultaneously transmit the at least one lost frame.

Figure 10B:
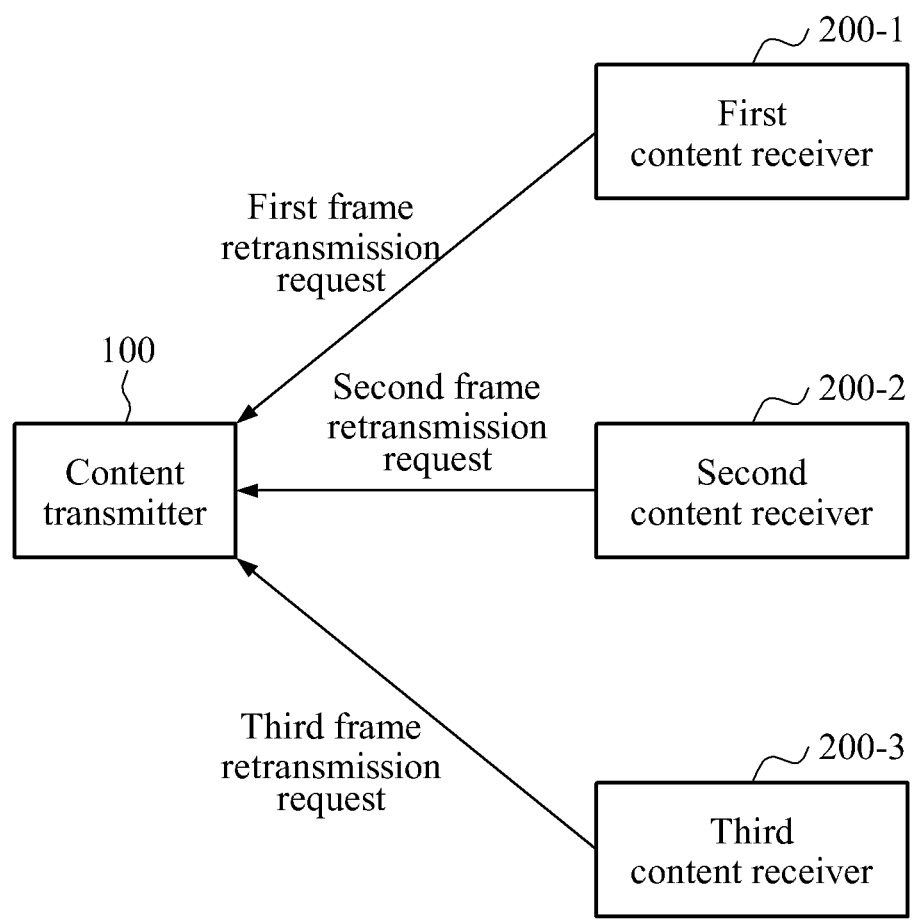
FIG. 10B is a diagram illustrating a example of an operation of a content transmission and reception system.
Figure 10C:
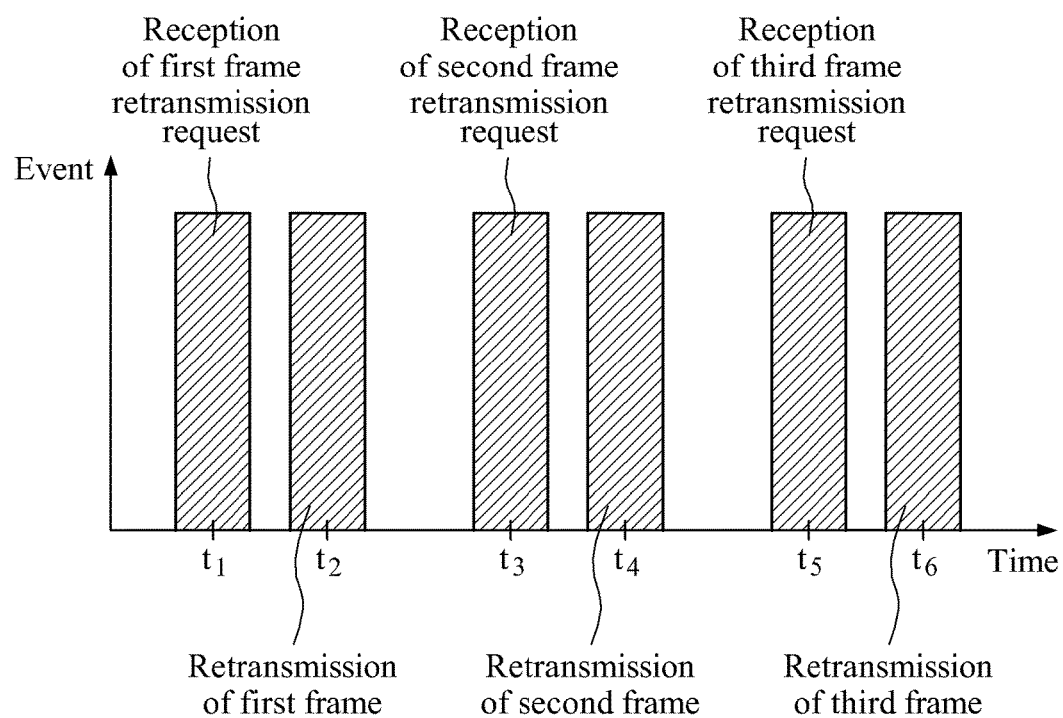
FIG. 10C is a diagram illustrating an example of a time at which a frame retransmission request is received, and an example of a time at which a frame is retransmitted.

FIG. 10B illustrates another example of an operation of a content transmission and reception system. FIG. 10C illustrates an example of a time at which a frame retransmission request is received, and an example of a time at which a frame is retransmitted.

The content transmitter 100 may receive a first frame retransmission request that requests it to retransmit a first frame from a first content receiver 200-1 at a first time $t_1$. The first frame may be a frame, such as, for example, a frame that is determined by the first content receiver 200-1 to be lost during a lost frame request period. The content transmitter 100 may retransmit the first frame to the first content receiver 200-1 at a second time $t_2$, which is shown in FIG. 10C.

The content transmitter 100 may receive a second frame retransmission request that requests it to retransmit a second frame from a second content receiver 200-2 at a third time $t_3$. The second frame may be a frame, such as, for example, a frame that is determined by the second content receiver 200-2 to be lost during the lost frame request period. The content transmitter 100 may retransmit the second frame to the second content receiver 200-2 at a fourth time $t_4$, which is shown in FIG. 10C.

The content transmitter 100 may receive a third frame retransmission request that requests it to retransmit of a third frame from a third content receiver 200-3 at a fifth time $t_5$. The third frame may be a frame, such as, for example, a frame that is determined by the third content receiver 200-3 to be lost during the lost frame request period. The content transmitter 100 may retransmit the third frame to the third content receiver 200-3 at a sixth time $t_6$, which is shown in FIG. 10C.

The first content receiver 200-1 to the third content receiver 200-3 may determine the first time $t_1$, the third time $t_3$, and the fifth time $t_5$, respectively, at which the first frame retransmission request to the third frame retransmission request are transmitted to the content transmitter 100. The first frame retransmission request to the third frame retransmission request are transmitted within a set lost frame request period. For example, the first content receiver 200-1 to the third content receiver 200-3 may randomly determine the first time $t_1$, the third time $t_3$, and the fifth time $t_5$, respectively, and accordingly the first time $t_1$, the third time $t_3$, and the fifth time $t_5$ may not overlap each other.

Figure 11B:
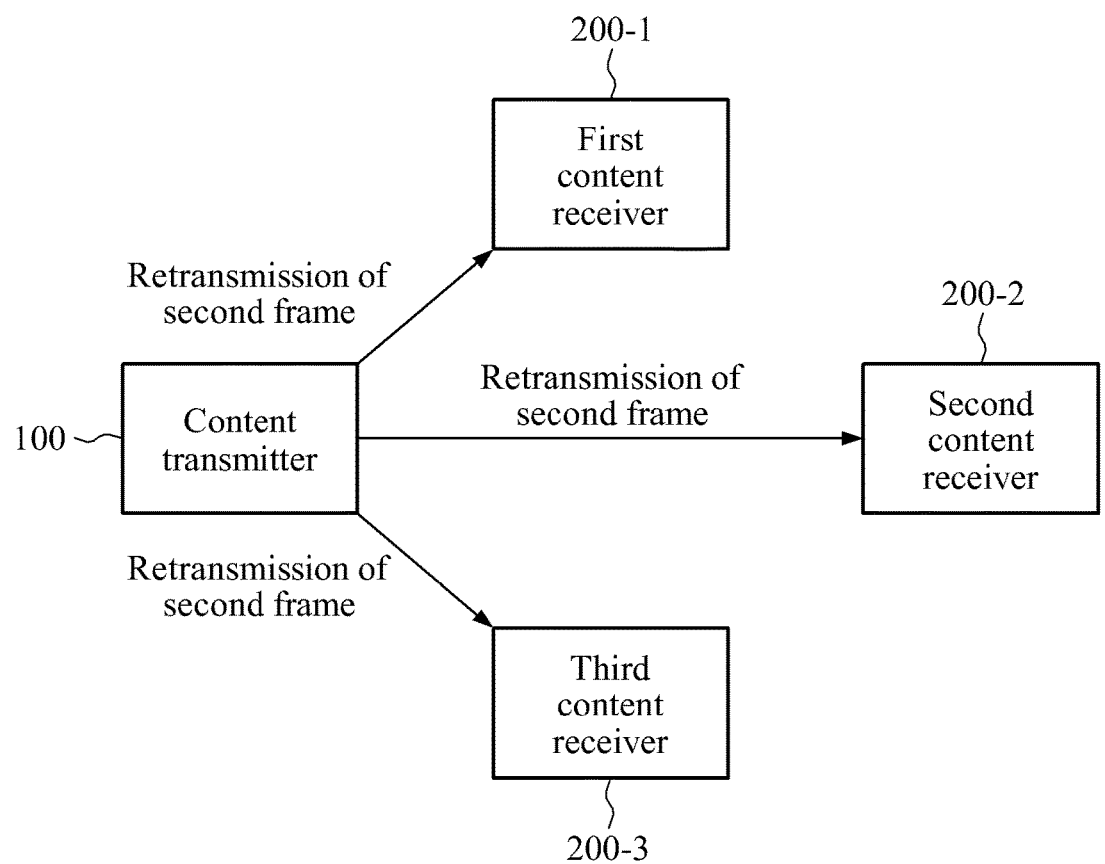

FIGS. 11A and 11B illustrate further examples of an operation of a content transmission and reception system.

In FIG. 11A, the second content receiver 200-2 may request the content transmitter 100 to retransmit a second frame. A distance between the second content receiver 200-2 and the content transmitter 100 may be greater than a distance between the first content receiver 200-1 and the content transmitter 100, or a distance between the third content receiver 200-3 and the content transmitter 100. Accordingly, a frame received by the second content receiver 200-2 may be lost more frequently, when compared to a frame received by the first content receiver 200-1 or the third content receiver 200-3. As illustrated in FIG. 11A, the second content receiver 200-2 is located farthest away from the content transmitter 100. In another example, the second content receiver 200-2 may be disposed in a shadow area of the content transmitter 100. That is, there may be various circumstances where a frame is lost relatively more frequently in a particular content receiver. A frame loss frequency may be determined, based on at least one of a received frame loss rate, and a signal-to-noise ratio (SNR) of a received frame.

Referring to FIG. 11B, the content transmitter 100 may multicast or broadcast the second frame to all of the first content receiver 200-1 to the third content receiver 200-3. Accordingly, a number of times a lost frame retransmission request packet is transmitted and received in an entire system may be reduced.

As a non-exhaustive illustration only, a terminal or device described herein may refer to mobile devices such as, for example, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths or the like), a personal computer (PC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, or any other device capable of wireless communication or network communication consistent with that disclosed herein.

The processes, functions, and methods described above including a method for beamforming can be written as a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device that is capable of providing instructions or data to or being interpreted by the processing device. The software also may be distributed over network coupled computer systems so that the software is stored and executed in a distributed fashion. In particular, the software and data may be stored by one or more non-transitory computer readable recording mediums. The non-transitory computer readable recording medium may include any data storage device that can store data that can be thereafter read by a computer system or processing device. Examples of the non-transitory computer readable recording medium include read-only memory (ROM), random-access memory (RAM), Compact Disc Read-only Memory (CD-ROMs), magnetic tapes, USBs, floppy disks, hard disks, optical recording media (e.g., CD-ROMs, or DVDs), and PC interfaces (e.g., PCI, PCI-express, WiFi, etc.). In addition, functional programs, codes, and code segments for accomplishing the example disclosed herein can be construed by programmers skilled in the art based on the flow diagrams and block diagrams of the figures and their corresponding descriptions as provided herein.

The apparatuses and units described herein may be implemented using hardware components. The hardware components may include, for example, controllers, sensors, processors, generators, drivers, and other equivalent electronic components. The hardware components may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The hardware components may run an operating system (OS) and one or more software applications that run on the OS. The hardware components also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a hardware component may include multiple processors or a processor and a controller. In addition, different processing configurations are possible, such a parallel processors.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of transmitting content, the method comprising:
   receiving, at a content transmitter, a content transmission request;
   fragmenting a segmented content corresponding to the content transmission request into at least one frame;
   generating a header comprising a frame identifier for the at least one frame in a link adaptor layer set as an upper layer of a media access control (MAC) layer, the frame identifier being associated with a frame number of the at least one frame, a name of the content, and a segment number of a seament comprising the at least one frame, wherein the frame number is defined in the link adaptor layer and the name of the content and the segment number are defined in an upper layer of the link adaptor layer; and
   transmitting the at least one frame and the header to the content receiver,
   wherein the receiving of the content transmission request comprises receiving a transmission request of a lost frame at a random time in a lost frame request duration, the lost frame request duration being a time frame during which the lost frame is to be requested.

2. The method of claim 1, wherein the generating of the header comprises generating the header with the frame identifier in the link adaptor layer, based on at least one of a name of the content and a segment number that are set in an upper layer of the link adaptor layer.

3. The method of claim 1, wherein the header is disposed in the at least one frame.

4. The method of claim 1, further comprising receiving a lost frame retransmission request from a content receiver.

5. The method of claim 4, wherein the lost frame retransmission request comprises a frame identifier of a frame that the content receiver did not received.

6. The method of claim 5, further comprising retransmitting a frame corresponding to the lost frame retransmission request to the content receiver, or multicasting or broadcasting the frame.

7. The method of claim 6, wherein the retransmitting of the frame comprises retransmitting a frame corresponding to a frame identifier comprised in the lost frame retransmission request.

8. The method of claim 6, wherein the retransmitting of the frame comprises retransmitting the frame in a link adaptor layer set as an upper layer of a MAC layer.

9. A method of receiving content from a content transmitter, the method comprising:
 transmitting a content transmission request to the content transmitter; and
 receiving at least one frame containing at least a portion of a segmented content corresponding to the content transmission request,
 wherein the at least one frame comprises a header with a frame identifier of the at least one frame, the header being generated in a link adaptor layer set as an upper layer of a media access control (MAC) layer,
 wherein the frame identifier is associated with a frame number of the at least one frame, a name of the content, and a segment number of a segment comprising the at least one frame,
 wherein the frame number is defined in the link adaptor layer and the name of the content and the segment number are defined in an upper layer of the link adaptor layer, and
 wherein the transmitting of the content transmission request comprise transmitting a transmission request of a lost frame at a random time in a lost frame request duration, the lost frame request duration being a time frame during which the lost frame is to be requested.

10. The method of claim 9, further comprising determining a lost frame that is not received from the content transmitter.

11. The method of claim 10, further comprising transmitting a lost frame retransmission request to the content transmitter.

12. The method of claim 11, wherein the lost frame retransmission request comprises a frame identifier of the lost frame.

13. The method of claim 11, further comprising collecting a frame corresponding to the lost frame retransmission request from the content transmitter.

14. The method of claim 13, wherein the collecting of the frame comprises receiving a frame corresponding to a frame identifier of the lost frame retransmission request.

15. The method of claim 13, wherein the collecting of the frame comprises collecting the frame in a link adaptor layer set as an upper layer of a media access control (MAC) layer.

16. The method of claim 10, wherein the determining comprises determining the lost frame based on a frame identifier of the received at least one frame.

17. A content receiver for receiving content from a content transmitter, the content receiver comprising:
 a communicator configured:
  to transmit a content transmission request to the content transmitter, based on a content name, and
  to receive at least one frame containing at least a portion of a segmented content corresponding to the content transmission request, the content name being defined in a first layer; and
 a controller configured:
  to determine a lost frame that is not received from the content transmitter, and
  to control the communicator to transmit a lost frame retransmission request based on a plurality of information defined in the first layer to request retransmission of the lost frame in a second layer, the second layer being a lower layer of the first layer and being a link adaptor layer set as an upper layer of a media access control (MAC) layer,
 wherein the plurality of information is associated with a frame number of the at least one frame, a name of the content, and a segment number of a segment comprising the at least one frame wherein the frame number is defined in the second layer and the name of the content and the segment number are defined in the first layer, and
 wherein the communicator is further configured to transmit a transmission request of a lost frame at a random time in a lost frame request duration, the lost frame request duration being a time frame during which the lost frame is to be requested.

* * * * *